United States Patent
Kocer et al.

[19]

[11] Patent Number: 6,120,060
[45] Date of Patent: Sep. 19, 2000

[54] REAR SUSPENSION SUPPORT ASSEMBLY

[75] Inventors: Bruce Kocer, Oxford; Scott Spicuzza, Sterling Heights; Walter A. Snyder, Plymouth, all of Mich.

[73] Assignee: The Budd Company, Troy, Mich.

[21] Appl. No.: 08/954,533

[22] Filed: Oct. 21, 1997

[51] Int. Cl.[7] ................................................ B62D 21/11
[52] U.S. Cl. ................................ 280/788; 280/124.109; 296/204
[58] Field of Search ............................... 280/788, 781, 280/124.109, 796; 296/204

[56] References Cited

U.S. PATENT DOCUMENTS

| | | |
|---|---|---|
| 2,129,232 | 9/1938 | Paton ........................................ 280/788 |
| 2,997,313 | 8/1961 | Wall ......................................... 280/788 |
| 3,595,176 | 7/1971 | Broling . |
| 4,830,396 | 5/1989 | Gandiglio ................................. 280/788 |
| 5,364,126 | 11/1994 | Kuretake et al. . |
| 5,385,369 | 1/1995 | Mukai et al. ............................. 280/788 |
| 5,433,479 | 7/1995 | Shida et al. ............................. 280/788 |
| 5,562,308 | 10/1996 | Kamei et al. . |
| 5,833,026 | 11/1998 | Zetterstrom et al. ............ 280/124.109 |

*Primary Examiner*—Peter C. English
*Attorney, Agent, or Firm*—Harness, Dickey & Pierce, P.L.C.

[57] ABSTRACT

A vehicle frame is provided including a pair of frame rails. A rear suspension support assembly extends between the pair of frame rails. The rear suspension support assembly includes a rear suspension crossmember having first and second ends each attached to one of the frame rails. A pair of spring brackets are attached to the rear suspension crossmember and to the frame rails. The rear suspension support assembly has a generally X-shaped configuration which improves the frame stiffness.

7 Claims, 3 Drawing Sheets

REAR SUSPENSION SUPPORT ASSEMBLY

FIELD OF THE INVENTION

The present invention relates generally to frame structures. More specifically, the invention relates to vehicle subframe structures for rear suspension systems.

BACKGROUND OF THE INVENTION

In the automotive industry, there is an ongoing effort to improve automobile quality while decreasing cost. In the field of automobile frame assemblies, there is an effort to increase frame stiffness and reduce cost. In the past, stiffness was achieved by adding more material to the frame and by providing more, thicker crossmembers. However, as more material is added, there is an incremental material cost involved. As a result, frame assemblies become heavier and bulkier and cost more to ship and handle. There is also a detriment in fuel economy with increased vehicle weight. Other factors to be considered are part complexity; as the number of components in a frame assembly increase, so does the assembly time. Increased assembly time is ultimately passed along to the consumer in increased prices. The present objective is to increase stiffness, decrease the number of parts and improve shipping and handling of the frame assemblies.

Current frame assemblies typically include a pair of frame rails, a front subframe, a rear subframe, and various crossmembers and support assemblies. Specifically, the rear suspension support assembly provides a mounting structure for the rear suspension system. There are a large number of parts that make up a rear suspension support assembly. Therefore, it is desirable to improve the current rear suspension support assemblies by reducing the number of parts that are included in the assembly.

In the conventional automobile, the vehicle frame rails are generally a pair of frame rails that extend in a longitudinal direction to the vehicle body while the crossmember of the rear suspension support assembly spans between the left and right frame rails in a transverse direction to the vehicle body. The crossmember of a rear suspension support assembly is rigidly mounted to the frame rails and is generally perpendicular to the vehicle frame rails. There are a number of ways that the crossmember can be attached to the frame rails, however the most common methods are either welding or by incorporating fasteners. There is a deficiency with this design, however, in that diagonal stiffness is deficient since the crossmembers form a 90° angle to the vehicle frame rails. Although the conventional design provides for good lateral stiffness, the design is compromised in its ability to transfer diagonal forces. Each crossmember is attached to a frame rail at one point, this single point attachment acts as a hinge when subject to diagonal loads. When there is a disproportionate load distributed between the left and right vehicle frame rails resulting in a diagonal force, a conventional rear suspension support assembly design will allow the frame rails to translate. Therefore, instead of transferring the diagonal load, a conventional rear suspension support assembly will yield.

Shipping costs for transporting frame assemblies can be reduced by increasing the number of frame assemblies that are stacked with each shipment, a limiting factor being the height of each frame assembly. If the frame assembly has a low-hanging component, the number of frame members which can be stacked and shipped is reduced. In some cases, the lowest hanging member of an automobile frame assembly is the track bar bracket. This results in an increase in shipping costs which are ultimately absorbed by the consumer. Therefore, there is a need for an improved rear suspension support assembly which provides for more efficient stacking of automobile vehicle frame assemblies.

SUMMARY OF THE INVENTION

Accordingly, it is an object of the present invention to provide a rear suspension support assembly with fewer parts.

It is a further object of the present invention to provide a rear suspension support assembly that improves the stiffness of the automobile frame assembly by providing a generally X-shaped configuration that increases the stiffness of the automobile frame assembly.

It is still another object to provide a rear suspension support assembly that includes a removable track bar bracket that improves the stacking capacity of the automobile frame assemblies by eliminating a low-hanging member from the automobile frame assembly.

Accordingly, the present invention provides a rear suspension support assembly for a vehicle having a pair of frame rails. The rear suspension support assembly has a crossmember which is comprised of a medial portion disposed in a first vertical plane and a pair of intermediate portions extending from the medial portion and a pair of lateral portions disposed in a second vertical plane offset from the first vertical plane. Each lateral portion extends from one of intermediate portions. A pair of spring brackets are attached to the rear suspension crossmember. Each of a pair of support brackets are attached to one of the pair of lateral portions of the rear suspension crossmember. Each support bracket is also attached to one of the frame rails. Each of a pair of body mount brackets are also attached to one of the pair of frame rails. A removable track bar bracket is provided having a first end and a second end. The first end is attached to the medial portion of the rear suspension crossmember directly or via a bracket and the second end of the track bar bracket is attached to one of the vehicle rails via a support bracket. Ancillary spacers are utilized for mounting the ends of the track bar bracket. Each of a pair of stabilizer bar brackets are attached to one of the lateral portions of the rear suspension crossmember.

From the subsequent detailed description taken in conjunction with the accompanying drawings and subjoined claims, other objects and advantages of the present invention will become apparent to those skilled in the art.

BRIEF DESCRIPTION OF THE DRAWINGS

The present invention will become more fully understood from the detailed description and accompanying drawings, wherein.

DESCRIPTION OF THE PREFERRED EMBODIMENT

Figure 1:
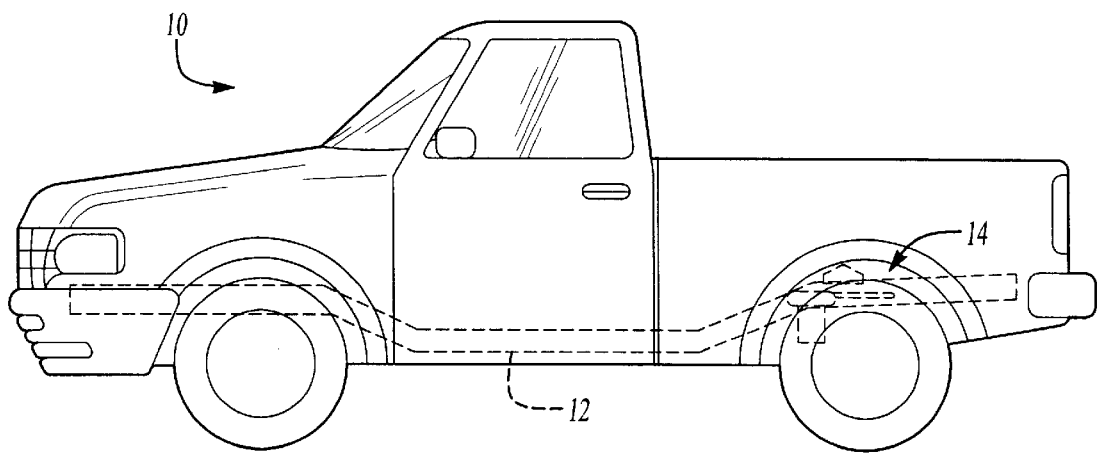
FIG. 1 is a side view of a sport-utility-type vehicle showing a vehicle frame according to the principles of the present invention in phantom.

Referring to the drawings, in particular FIG. 1, a vehicle 10, for instance a sport-utility-type vehicle is shown having a frame assembly 12 shown in phantom lines in a typical vehicle location. Frame assembly 12 includes a rear suspension support assembly 14 also shown in phantom.

Figure 3:
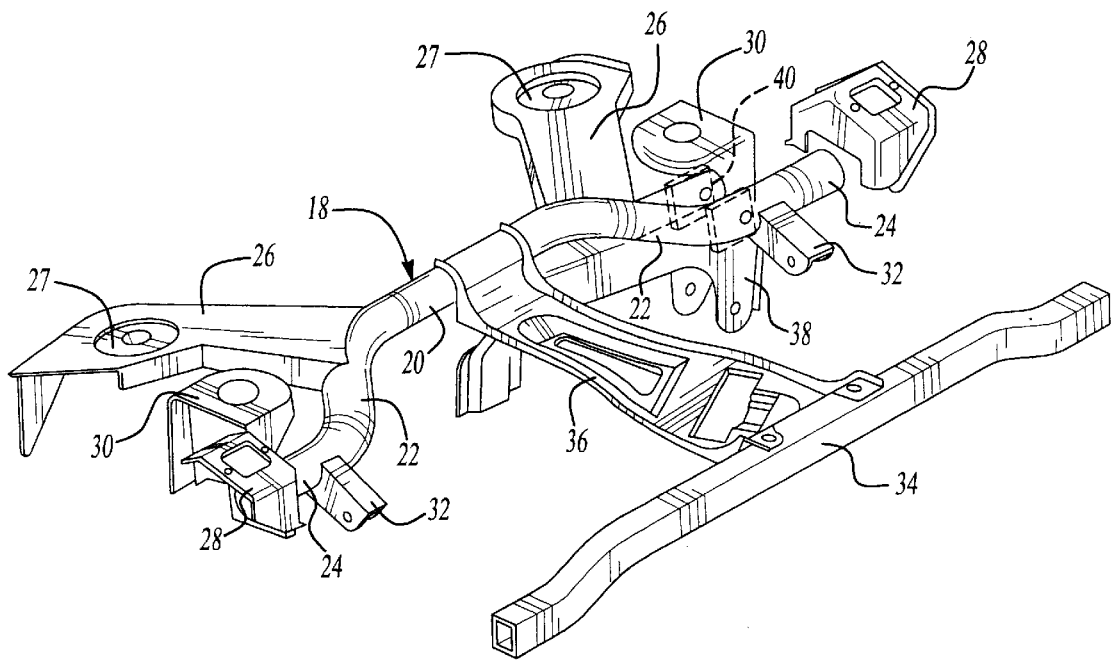
FIG. 3 is a perspective view of a rear suspension support assembly according to the principles of the present invention.
Figure 2:
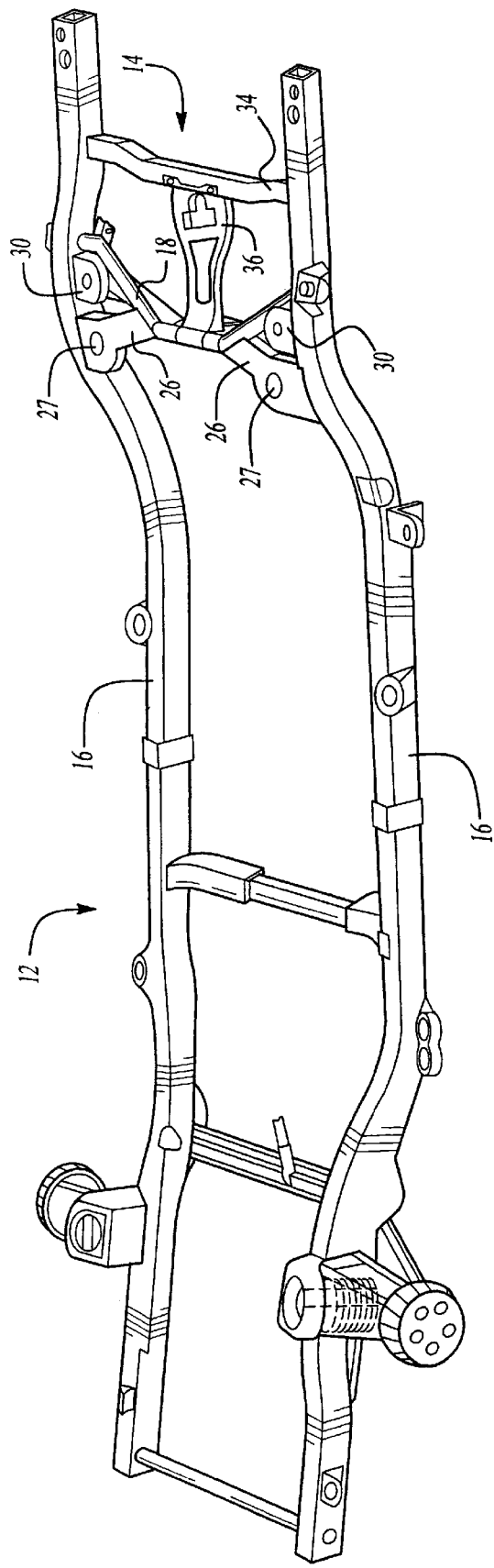
FIG. 2 is a perspective view of a vehicle frame including a rear suspension support assembly according to the principles of the present invention.

Referring now to FIGS. 2 and 3, the rear suspension support assembly 14 is attached to a pair of frame rails 16 which extend in a longitudinal direction to the vehicle 10. The rear suspension support assembly 14 extends transversely to the frame rails 16. The rear suspension support assembly 14 includes a rear suspension crossmember 18. The rear suspension crossmember 18 in the embodiment shown is constructed from a hollow tube. The rear suspension crossmember 18 has a circular cross section. However, it should be appreciated by those skilled in the art that any suitable sectional design such as a rectangular section may also be used.

Figure 4:
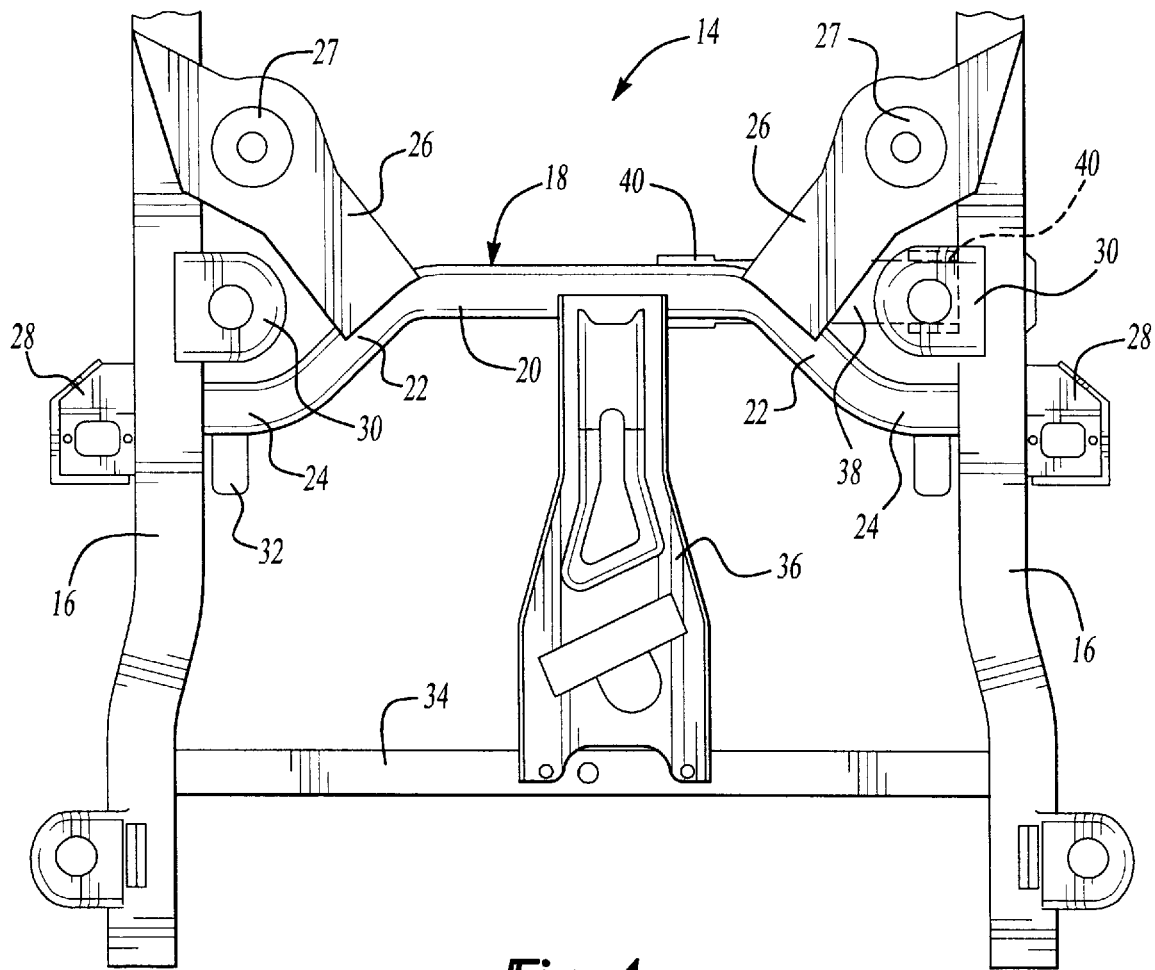
FIG. 4 is a plan view of the rear suspension support assembly according to the principles of the present invention.

Referring now to FIG. 4, the rear suspension crossmember 18 includes a medial portion 20, a pair of intermediate portions 22 extending from respective ends of the medial portion 20 and a pair of lateral portions 24 extending from the intermediate portions 22. The medial portion 20 is disposed in a first vertical plane generally perpendicular to the longitudinal axis of the vehicle 10. The pair of lateral portions 24 are disposed in a second vertical plane that is offset from the first vertical plane and which is also generally perpendicular to the longitudinal axis of the vehicle 10. The intermediate portions 22 provide a structural connection between the medial portion 20 and the pair of lateral portions 24. The intermediate portions 22 are angularly disposed relative to medial portion 20 and to lateral portions 24. The rear suspension crossmember 18 may be manufactured from a single piece or from multiple pieces joined by any manufacturing process known in the art.

The lateral portions 24 of the rear suspension crossmember 18 are suitably attached to a pair of support brackets 28. Each of the pair of support brackets 28 are disposed on one of the frame rails 16. The lateral portions 24 of the rear suspension crossmember 18 are disposed through apertures in each of the frame rails 16 and are suitably attached to the support brackets 28 by welding or any suitable method.

A pair of spring brackets 26 are suitably attached to each of the frame rails 16 at one end of the spring brackets 26. A second end of the spring brackets are suitably attached to the rear suspension crossmember 18. The spring brackets 26 are preferably attached to either the intermediate portions 22 or the medial portion 20 of the rear suspension crossmember 18. In the preferred embodiment, the spring brackets 26 are cantilever type brackets which allow for a single piece construction. A single-piece construction is cost effective from both a manufacturing and an assembly standpoint. A single-piece construction is also stronger than a plurality of parts fastened together. By welding the pair of spring brackets 26 in an angular fashion to the rear suspension crossmember 18, a generally X-shaped crossmember assembly is formed. Spring brackets 26 each support a rear suspension spring (not shown) in spring seat portions 27. The rear suspension springs extend between the spring seat portions 27 of the spring brackets 26 and the rear axle housing (not shown). The spring seat portions 27 are located laterally inward of said frame rails 16.

In a typical automobile, a force couple is present in a variety of situations where the force couple acts on the frame rails. The force couple acts on the frame rails to force the frame rails to move in a longitudinal direction opposite one another. In a conventional rear suspension support assembly, a crossmember or a plurality of crossmembers are disposed transverse to the frame rails in order to prevent relative motion between the frame rails. The addition of the crossmembers provides strength along the axis of the crossmember itself. However, even though the crossmembers may be sufficiently rigidly attached to the frame rails, the geometric disposition of the transverse crossmember is not well suited to oppose a force couple longitudinal or diagonal to the frame rails. The lack of rigidity in the longitudinal direction results in a hinging effect of the crossmember to the vehicle frame rails.

The generally X-shaped crossmember assembly (18, 26) formed by the rear suspension crossmember 18 and a pair of spring brackets 26, prevent relative motion between the frame rails due to a longitudinal or diagonal force couple on the frame rails. When a force couple is applied to a frame assembly embodying the X-shaped assembly of the present invention, part of the generally X-shaped assembly will act to resist forces in tension and the other part of the generally X-shaped assembly will act to resist forces in compression. One-half of the generally X-shaped assembly of the present invention resists a longitudinal force opposite to the other half of the generally X-shaped assembly to substantially reduce relative motion between the frame rail pair.

The geometry of the rear suspension support assembly is such that the medial portion 20 creates an angle of approximately 120° with a longitudinal axis of the cantilever portion of the spring brackets 26.

The rear suspension support assembly 14 also includes a pair of body mount brackets 30 each of which are suitably attached to one of the pair of frame rails 16. The body mount brackets 30 are isolated from the spring brackets 26 which provides improved noise vibration and harshness characteristics in the cabin of the vehicle. Also mounted on the rear suspension crossmember 18 at each of the pair of lateral portions 24 is one of a pair of stabilizer bar brackets 32. In the present invention, the stabilizer bar brackets 32 are welded to the rear suspension crossmember 18. It should once again be noted that any suitable method known in the art for fastening the stabilizer bar brackets 32 to the rear suspension crossmember 18 can be substituted for welding. Additional support for the frame assembly 12 is achieved by the addition of a rear crossmember 34 which is transversely disposed between and rigidly mounted to the pair of frame rails 16. A spare tire cradle 36 having a first end suitably attached to the medial portion 20 of the rear suspension crossmember 18 and a second end suitably attached to the rear crossmember 34 also provides additional support.

Figure 5:
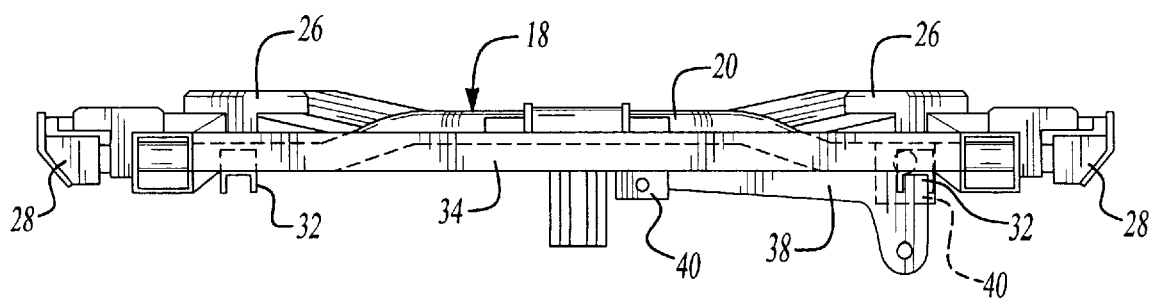
FIG. 5 is a side view of the rear suspension support assembly according to the principles of the present invention.

Referring now to FIGS. 3 and 5, the present invention also includes a removable track bar bracket 38. The removable track bar bracket 38 provides the capability to maximize the number of frame assemblies 12 that can be shipped at one time in the event that the track bar bracket is the lowest hanging point on the frame assembly 12. The track bar bracket 38 has a first end which is attached to the medial portion 20 of the rear suspension crossmember 18 and a second end which is attached to one of the pair of body mount brackets 30. In a preferred embodiment, a pair of track bar bracket mounting supports 40 are suitably attached to the body mount bracket 30 (not shown) and to the medial portion 20 of the rear suspension crossmember 18. The mounting supports 40 are attached by welding. However, any suitable method known in the art may be substituted. The mounting supports 40 are included to provide ease in the removal and installation of the removable track bar bracket

38. It should be noted that the track bar bracket 38 may be directly attached to the medial portion 20 of the rear suspension crossmember 18 and the body mount bracket mount 30.

It is understood that many modifications and variations of the present invention are possible in light of the above teachings. Therefore, any other embodiments which fall within the scope and spirit of the present invention are intended to be covered by the following claims.

What is claimed is:

1. A rear suspension support assembly for a vehicle having frame rails comprising:
    a rear suspension crossmember extending between the frame rails, said rear suspension crossmember having a medial portion disposed in a first vertical plane, a pair of intermediate portions angularly extending from said medial portion, a pair of lateral portions each extending from one of said pair of intermediate portions wherein said lateral portions are generally disposed in a second vertical plane offset from the first vertical plane; and
    a pair of spring brackets adapted for supporting a suspension spring member attached to said rear suspension crossmember;
    removable track bar bracket having a first end and a second end;
    a pair of body mount brackets, each body mount bracket adapted to be attached to one of the frame rails;
    a first mounting support attached to said medial portion of said rear suspension crossmember and a second mounting support attached to one of said pair of body mount brackets;
    wherein said first end of said track bar bracket is attached to said first mounting support and said second end of said track bar bracket is attached to said second mounting support.

2. The rear suspension support assembly according to claim 1 further comprising:
    a pair of support brackets each attached to one of said pair of lateral portions of said rear suspension crossmember wherein each of said support brackets are adapted to be attached to one of the frame rails.

3. The rear suspension support assembly according to claim 1, wherein each of said pair of spring brackets are adapted to be attached to one of the frame rails.

4. The rear suspension support assembly according to claim 1, further comprising:
    a pair of stabilizer bar brackets each attached to one of said pair of lateral portions of said rear suspension crossmember;
    a rear crossmember;
    a spare tire cradle having a first end and second end, wherein said first end of said spare tire cradle is attached to said medial portion of said rear suspension crossmember and said second end of said spare tire cradle is attached to said rear crossmember.

5. A vehicle frame comprising:
    a pair of frame rails;
    a rear suspension crossmember extending between said pair of frame rails, said rear suspension crossmember having a medial portion disposed in a first vertical plane and a pair of lateral portions disposed in a second vertical plane offset from said first vertical plane;
    a pair of spring brackets adapted for supporting a suspension spring member each having a first end attached to said rear suspension crossmember and a second end attached to one of said pair of frame rails;
    a pair of support brackets each attached to one of said frame rails;
    a removable track bar bracket having a first end and a second end:
    a pair of body mount brackets, each body mount bracket attached to one of said frame rails;
    a first mounting support attached to said medial portion of said rear suspension crossmember and a second mounting support attached to one of said pair of body mount brackets;
    wherein said first end of said track bar bracket is attached to said first mounting support and said second end of said track bar bracket is attached to said second mounting support.

6. The vehicle frame according to claim 5, further comprising:
    a pair of stabilizer bar brackets each attached to one of said pair of lateral portions of said rear suspension crossmember;
    a rear crossmember extending between said pair of frame rails and spaced from said rear suspension crossmember;
    a spare tire cradle having a first end and second end, wherein said first end of said spare tire cradle is attached to said medial portion of said rear suspension crossmember and said second end of said spare tire cradle is attached to said rear crossmember.

7. A vehicle frame comprising:
    a pair of frame rails;
    a rear suspension crossmember having a medial portion and a pair of lateral portions each attached directly to one of said frame rails;
    a removable track bar bracket having a first end and a second end, wherein said first end of said track bar bracket is attached to said rear suspension crossmember and said second end of said track bar bracket is attached to a body mount bracket; and
    a first mounting support attached to said medial portion of said rear suspension crossmember and a second mounting support attached to said body mount bracket;
    wherein said first end of said track bar bracket is attached to said first mounting support and said second end of said track bar bracket is attached to said second mounting support.

\* \* \* \* \*